July 19, 1966 H. MÜLLER 3,261,337
WATER-COOLED INTERNAL COMBUSTION ENGINE
Filed April 16, 1964 2 Sheets-Sheet 1

INVENTOR.
Hans Müller
BY
Michael J. Striker

July 19, 1966  H. MÜLLER  3,261,337
WATER-COOLED INTERNAL COMBUSTION ENGINE
Filed April 16, 1964  2 Sheets-Sheet 2

INVENTOR.
Hans Müller
BY
Michael J. Striker

United States Patent Office 3,261,337
Patented July 19, 1966

3,261,337
WATER-COOLED INTERNAL COMBUSTION ENGINE
Hans Müller, Im Rosental 19, Andernach, Germany
Filed Apr. 16, 1964, Ser. No. 360,393
Claims priority, application Germany, Apr. 19, 1963,
H 48,881
6 Claims. (Cl. 123—41.31)

The present invention relates to internal combustion engines, and more particularly to an improved water-cooled internal combustion engine. Still more particularly, the invention relates to an internal combustion engine which is particularly suited for use in watercraft.

It is an important object of my invention to provide a water-cooled internal combustion engine wherein each exhaust duct is subjected to comparatively low thermal stresses, wherein the exhaust duct or ducts may be manufactured of light metal to reduce the overall weight of the engine and wherein castings which constitute the shells of an exhaust duct may be joined in an airtight manner by means of a suitable adhesive to prevent any uncontrolled escape of combustion products and to reduce the number of fasteners.

Another object of the invention is to provide a water-cooled exhaust duct of the just outlined characteristics and to mount the exhaust duct in such a way that it may be cooled by the same medium which cools the housing of the engine.

A further object of the invention is to provide a novel method of cooling the exhaust duct or ducts and the housing of an internal combustion engine for watercraft.

An additional object of the invention is to provide a method of the just outlined characteristics according to which the housing of the engine is cooled by water which is subjected to heating prior to entering the jackets of the cylinders to prevent excessive localized cooling of the engine in cool weather.

With the above objects in view, one feature of my invention resides in the provision of a method of cooling an internal combustion engine for watercraft wherein products of combustion developing in the cylinders of the engine are discharged through one or more exhaust ducts. The method comprises the steps of drawing one or more streams of water from the body of water on which the watercraft is located, directing such stream or streams first through one or more channels provided in an exhaust duct so that the exhaust duct is cooled to a temperature which is low enough to allow for making the duct of light metal and for joining its sections by means of a suitable adhesive substance, thereupon directing the thus preheated stream or streams through the jacket or jackets of the housing to cool the cylinders, and discharging spent water from the housing back into the body of water.

In its basic form, the structure which embodies my invention comprises a housing having cooling jacket means for one or more cylinders of the engine, an exhaust duct secured to the housing and defining internal channel means in communication with the jacket means, and pump means or the like for feeding water into the channel means so that such water cools the exhaust duct prior to entering the jacket means.

The novel features which are considered as characteristic of the invention are set forth in particular in the appended claims. The improved internal combustion engine itself, however, both as to its construction and its mode of operation, together with additional features and advantages thereof, will be best understood upon perusal of the following detailed description of a specific embodiment with reference to the accompanying drawings, in which:

Figure 1:
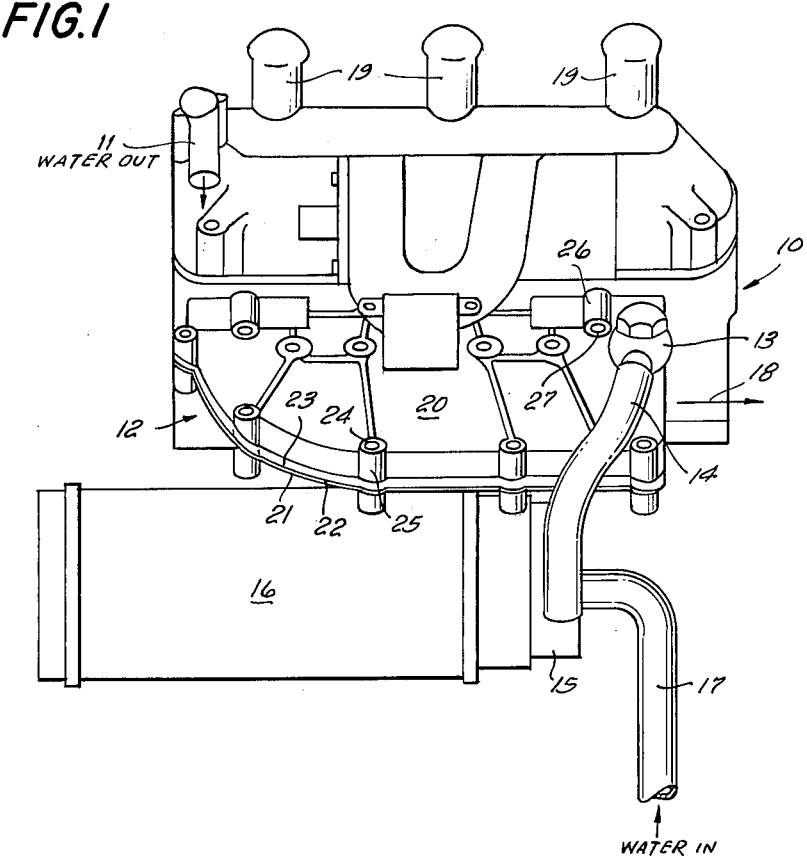
FIG. 1 is a side elevational view of a two-stroke cycle boat engine without valves which embodies the invention.
Figures 4, 8:
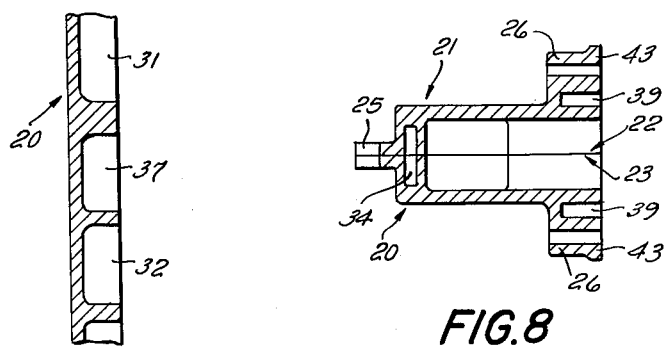
FIG. 4 is a fragmentary section as seen in the direction of arrows from the line IV—IV of FIG. 2.
FIG. 8 is a transverse section through the assembled exhaust duct substantially as seen in the direction of arrows from the line VIII—VIII of FIG. 6.

Referring to FIG. 1, there is shown a two-stroke cycle V-type internal combustion engine including a cylinder housing 10 having two banks of three cylinders each (only one bank shown). The cylinders are provided with cooling jackets of the type disclosed in my copending application Serial No. 353,213, filed March 18, 1964, entitled "Liquid-cooled internal combustion engine," and the jackets communicate with an outlet 11 which discharges hot water back into the body of water on which the watercraft is supported. In accordance with the present invention, each bank of cylinders is connected with an exhaust duct 12 of special construction (only one shown in FIG. 1), and this duct 12 serves to evacuate exhaust gases from the cylinder chambers as well as to admit water through special channels provided for this purpose and to convey it to the jackets which in turn convey such water to the outlet 11. The inlet 13 of the above-mentioned special channels in the exhaust duct is connected with a supply conduit 14 leading to the pressure side of a pump 15 which is driven by an electric generator 16 and which draws water from the body of water through a suction conduit 17. Thus, water drawn through the conduit 17 flows through the conduit 14 and inlet 13, thereupon through internal channels of the exhaust duct 12, in the cooling jackets of the cylinders in the housing 10, and is returned into the body of water through the outlet 11. Products of combustion are discharged in a direction indicated by arrow 18, and the numerals 19 indicate caps for spark plugs.

The exact construction of the exhaust duct 12 is illustrated in FIGS. 2 to 8. This duct comprises two mirror symmetrical shells 20, 21 whose abutting end faces 22, 23 (see FIGS. 7 and 8) are bonded to each other by adhesive. The shells 20, 21 consist of light metal, preferably an alloy of aluminum, and are additionally secured to each other by bolts, rivets or similar fasteners 24 passing through registering eyes 25 provided on the marginal portions of the shells. The shells are provided with additional eyes 26 for bolts or similar fasteners 27 which provide a detachable connection between the housing 10 and exhaust duct 12. The two shells define between themselevs a series of exhaust passages 30, 31, 32 which merge into a common exhaust passage 33. The passages 30–32 receive products of combustion from the respective cylinders in the housing 10 and the passage 33 discharges gases into an exhaust pipe, not shown, in the direction indicated in FIGS. 1 and 2 by the arrow 18.

In addition to the passages 30–33, the shells 20, 21 define between themselves a series of cooling channels 34, 35, 36, 37 which communicate with the supply conduit 14 and which discharge into the cooling jackets of the cylinders in the housing 10. The channels 34–37 are formed by recesses provided in the inner sides of the shells, and such recesses are in registry when the faces 22, 23 are bonded to each other.

The adhesive substance which is utilized to bond the faces 22, 23 of the shells 20, 21 to each other may be a material sold under the name Araldit (trademark) or an equivalent adhesive. This substance is applied before the fasteners 24 are drawn tight so that it is allowed to set under pressure whereby it provides a highly satisfactory seal between the shells. It is also possible to utilize a similar adhesive substance to provide a seal along the faces 43 which abut against the housing 10.

Figure 2:
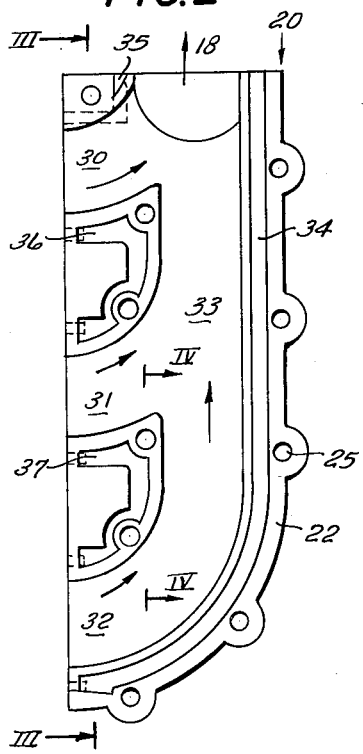
FIG. 2 is an elevational view showing the inner side of one shell of an exhaust duct which is used in the engine of FIG. 1.
Figure 5:
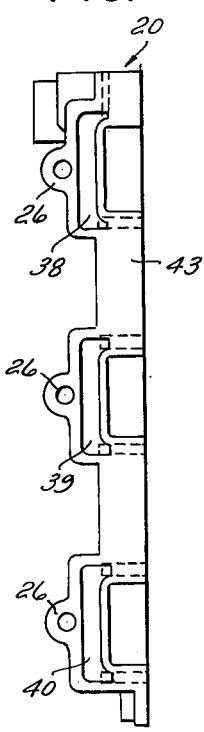
FIG. 5 is an end view of the shell as seen from the left-hand side of FIG. 2.
Figure 6:
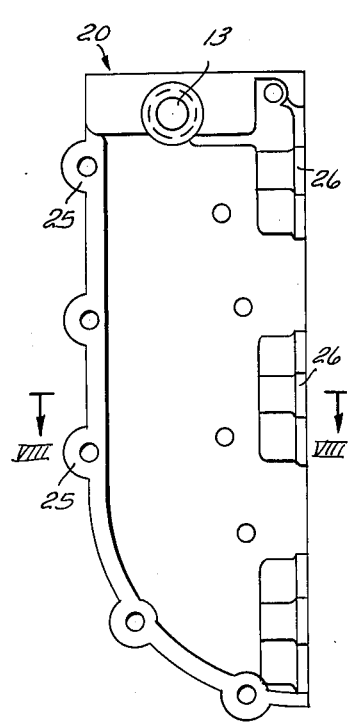
FIG. 6 illustrates the outer side of the shell.
Figure 3:
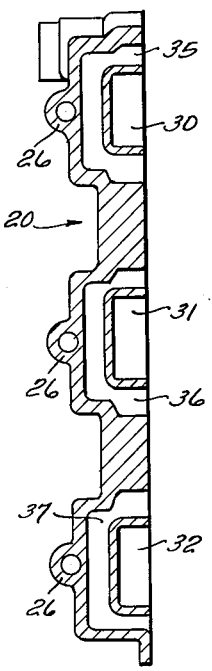
FIG. 3 is a section as seen in the direction of arrows from the line III—III of FIG. 2.

The channels 34–37 shown in FIG. 2 serve to connect the channels 38, 39 and 40 of FIG. 5. Each of the channels 38–40 communicates with a separate cooling jacket in the housing 10 so that each such channel conveys preheated water to the jacket of the respective cylinder. Such preheating of water prevents excessive cooling of the engine, particularly when the pump draws water from a very cold river, pond, lake or another body of water.

Figure 7:
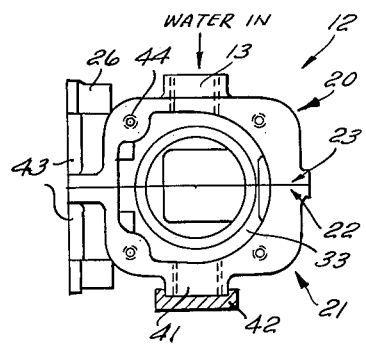
FIG. 7 is an end elevational view of the fully assembled exhaust duct as seen from above in FIG. 2 or 6.

The inlet 41 of the shell 21 shown in FIG. 7 is sealed by a suitable plug 42 because it is not needed when the exhaust duct 12 is in actual use. This inlet 41 is used to admit water if the duct 12 is mounted at the other side of the housing 10 to receive exhaust gases from the other bank of cylinders. The engine of FIG. 1 is a V-type engine having six cylinders which form two banks with three cylinders each. Of course, if the inlet 41 admits water, the inlet 13 is sealed by a suitable plug.

Since the exhaust duct 12 (and the non-illustrated second exhaust duct) consists of light metal, the weight of the engine is reduced considerably which is another important advantage of a water-cooled exhaust duct.

The numeral 44 of FIG. 7 indicates tapped holes which receive bolts (not shown) securing the shells 20, 21 to an exhaust pipe which receives gases from the discharge end of the passage 33.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an internal combustion engine for watercraft, in combination, a cylinder housing having cooling jacket means; an exhaust duct detachably secured to said housing and consisting of light metal and comprising a pair of shells having superimposed mating faces respectively provided with mirror-symmetrical open grooves therein, said shells being bonded together whereby said mirror-symmetrical grooves together form internal cooling channels which are in communication with said jacket means; and pump means arranged to feed water into said internal cooling channels so that the exhaust duct is cooled before such water enters said jacket means.

2. A combination as set forth in claim 1, wherein said shells of said exhaust duct are bonded together by an adhesive.

3. As a novel article of manufacture for use in water-cooled internal combustion engines for watercraft, an exhaust duct comprising a pair of light metal shells having abutting faces bonded to each other, said abutting faces being respectively formed with mirror-symmetrical open grooves therein, said grooves defining together at least one internal cooling channel in said exhaust duct when said faces of said shells abut, whereby water may be led through said internal channel to cool said exhaust duct, and threaded fasteners providing an additional connection between said faces.

4. An exhaust duct as set forth in claim 3, wherein said shells define between themselves a plurality of water conveying channels and wherein said channels are arranged to discharge into the cooling jackets of the cylinder housing.

5. An exhaust duct as set forth in claim 3, wherein said shells are mirror symmetrical with reference to each other and consist of an alloy of aluminum.

6. An exhaust duct as set forth in claim 3, wherein at least one of said shells is provided with a water-admitting inlet in communication with said channel.

References Cited by the Examiner

UNITED STATES PATENTS

| | | | |
|---|---|---|---|
| 1,414,009 | 4/1922 | Brownback | 123—41.31 X |
| 2,031,123 | 2/1936 | Mutschler. | |
| 2,067,253 | 1/1937 | Wohanka | 60—31 |
| 2,505,962 | 5/1950 | Hartley | 123—52 |
| 2,757,650 | 8/1956 | Holley | 123—41.08 |

MARK NEWMAN, *Primary Examiner.*

KARL J. ALBRECHT, *Examiner.*